(12) United States Patent
Fujii et al.

(10) Patent No.: US 8,906,528 B2
(45) Date of Patent: Dec. 9, 2014

(54) BICYCLE ELECTRIC POWER SOURCE ASSEMBLY

(71) Applicant: Shimano Inc., Sakai, Osaka (JP)

(72) Inventors: Kazuhiro Fujii, Osaka (JP); Takafumi Katsura, Osaka (JP)

(73) Assignee: Shimano Inc., Osaka (JP)

( * ) Notice: Subject to any disclaimer, the term of this patent is extended or adjusted under 35 U.S.C. 154(b) by 109 days.

(21) Appl. No.: 13/742,863

(22) Filed: Jan. 16, 2013

(65) Prior Publication Data

US 2013/0202938 A1 Aug. 8, 2013

(30) Foreign Application Priority Data

Feb. 3, 2012 (JP) .................. 2012-021721

(51) Int. Cl.
*H01M 2/10* (2006.01)
*B62J 1/08* (2006.01)

(52) U.S. Cl.
CPC ............... *H01M 2/1016* (2013.01); *B62J 1/08* (2013.01); *B62K 2208/00* (2013.01)
USPC ........................................... 429/100; 429/96

(58) Field of Classification Search
USPC ............... 429/96, 100; 180/205.1; 280/288.4
See application file for complete search history.

(56) References Cited

U.S. PATENT DOCUMENTS

| 6,158,881 | A | * | 12/2000 | Carne | 362/473 |
| 8,651,212 | B2 | * | 2/2014 | Vincenz | 180/205.1 |
| 2011/0042156 | A1 | * | 2/2011 | Vincenz | 180/205 |
| 2013/0147153 | A1 | * | 6/2013 | Fujii et al. | 280/288.4 |
| 2014/0141310 | A1 | * | 5/2014 | Li | 429/100 |

* cited by examiner

*Primary Examiner* — Stewart Fraser
(74) *Attorney, Agent, or Firm* — Global IP Counselors

(57) ABSTRACT

A bicycle electric power source assembly comprises a tubular member, an electric power source member and a restricting member. The tubular member includes an inner peripheral surface, an outer peripheral surface and a through hole that passes through the tubular member between the inner peripheral surface and the outer peripheral surface. The electric power source member is disposed inside the tubular member. The electric power source member includes a restriction accepting part. The restricting member is disposed in the through hole. The restricting member includes a restricting part that engages with the restriction accepting part to restrict relative movement of the electric power source member with respect to the tubular member in an axial direction of the tabular member.

14 Claims, 6 Drawing Sheets

BICYCLE ELECTRIC POWER SOURCE ASSEMBLY

CROSS-REFERENCE TO RELATED APPLICATIONS

This application claims priority under 35 U.S.C. §119 to Japanese Patent Application No. 2012-021721 filed Feb. 3, 2012. The entire disclosure of Japanese Patent Application No. 2012-021721 is hereby incorporated herein by reference.

BACKGROUND

1. Field of the Invention

This invention generally relates to a bicycle electric power source assembly. More specifically, the present invention relates to a bicycle electric power source assembly equipped with an electric power source and a tubular member. Also the present invention relates to an electric power source member and to a tubular member into which an electric power source member is inserted.

2. Background Information

In the bicycling field, there are known electric power source assemblies (e.g., see U.S. Pat. No. 6,158,881) in which a battery or other electric power source is held in a seat post and supplies electric power to an electrical component installed on a bicycle. The conventional electric power source assembly basically includes a tubular member having the form of a seat post, an electric power source member, a cap, a spring member provided on the cap and a receiving part. The power source member is inserted into the interior of the tubular member. The cap is screwed onto a second end portion of the tubular member that is opposite from a first end portion on which a saddle is mounted. The spring member presses one end of the electric power source member toward the first end portion. The receiving part receives a spring force from the spring member by contacting the other end of the electric power source member, which is pressed by the spring member. With the conventional electric power source assembly, relative movement of the electric power source member in an axial direction is restricted by the electric power source member being pressed by the spring member and the spring force being received by the receiving part.

SUMMARY

In the conventional electric power source assembly, movement of the electric power source member relative to the tubular member in an axial direction is restricted by the cap, the spring member and the receiving part. Consequently, the structure of the electric power source assembly is complex.

An object of the present invention is to provide an electric power source assembly in which relative movement of the electric power source member with respect to the tubular member in an axial direction of the tubular member is restricted using a simpler structure.

In accordance with a first aspect presented in this disclosure, a bicycle electric power source assembly is provided which is capable of being installed on a bicycle. In this first aspect, a bicycle electric power source assembly is provided that basically comprises a tubular member, an electric power source member and a restricting member. The tubular member includes an inner peripheral surface, an outer peripheral surface and a through hole that passes through the tubular member between the inner peripheral surface and the outer peripheral surface. The electric power source member is disposed inside the tubular member. The electric power source member includes a restriction accepting part. The restricting member is disposed in the through hole. The restricting member includes a restricting part that engages with the restriction accepting part to restrict relative movement of the electric power source member with respect to the tubular member in an axial direction of the tubular member.

With this bicycle electric power source assembly, the electric power source member is inserted into the tubular member and the restricting member is arranged in the through hole such that the restricting part of the restricting member engages with the restriction accepting part of the electric power source member. As a result, the electric power source member is restricted from moving relative to the tubular member in the axial direction. Relative movement of the electric power source member with respect to the tubular member can be restricted simply by arranging the restricting member in the through hole such that the restricting part engages with the restriction accepting part. That is, movement of the electric power source member can be restricted with a simple structure.

In accordance with a second aspect presented in this disclosure, the bicycle electric power source assembly according to the first aspect further comprises a positioning member arranged in a gap formed between the electric power source member and the inner peripheral surface of the tubular member, and positioning the electric power source member with respect to a radial direction of the tubular member. With this aspect, the electric power source member can be inserted into tubular members of various internal dimensions by setting the size of the electric power source member such that a gap will exist between the electric power source member and the inner peripheral surface of the tubular member. Even if a gap is provided, the electric power source member can be positioned in the radial direction of the tubular member by the positioning member. Thus, tubular members having different inner peripheral surfaces can be accommodated and movement of the electric power source member can be restricted in the axial and radial directions.

In accordance with a third aspect presented in this disclosure, the bicycle electric power source assembly according to the second aspect is further configured such that the gap is an annular gap and the positioning member is an annular member. With this aspect, the electric power source member can be positioned reliably in the radial direction because the annular positioning member is arranged in the annular gap.

In accordance with a fourth aspect presented in this disclosure, the bicycle electric power source assembly according to the third aspect is further configured such that the annular gap is circular and the positioning member is circular. With this aspect, the positioning member can be arranged inside the tubular member easily because the gap and the positioning member both have circular annular shapes.

In accordance with a fifth aspect presented in this disclosure, the bicycle electric power source assembly according to any one of the first to fourth aspects is further configured such that the restriction accepting part of the electric power source member includes one of a recess and a protrusion that is provided on an outer peripheral surface of the electric power source member. The restricting part of the restricting member includes the other of the recess and the protrusion. The recess and the protrusion fit together and restrict relative movement of the electric power source member in the axial direction of the tubular member. With this aspect, the structure is even simpler because relative movement of the electric power source member in the axial direction is restricted by the fitting together of the recess and the protrusion.

In accordance with a sixth aspect presented in this disclosure, the bicycle electric power source assembly according to the fifth aspect is further configured such that the restriction accepting part of the electric power source member includes the recess and the restricting part of the restricting member includes the protrusion. With this aspect, the size of the electric power source member can be suppressed because the restricting part provided on the electric power source member is a recess.

In accordance with a seventh aspect presented in this disclosure, the bicycle electric power source assembly according to the sixth aspect is further configured such that the recess of the electric power source member is an annular groove. With this aspect, since the recess that engages with the protrusion is an annular groove, the recess and the protrusion can fit together regardless of the position of the electric power source member in a circumferential direction. Thus, electric power source assembly can be assembled more easily because it is not necessary to position the electric power source member in the circumferential direction with respect to the tubular member.

In accordance with an eighth aspect presented in this disclosure, the bicycle electric power source assembly according to the first aspect is further configured such that the restriction accepting part of the electric power source member includes a recess having a biasing member disposed in the recess, the restricting member is movably disposed in the recess to advance and retract with respect to the tubular member, and the biasing member biases the restricting member toward the tubular member.

With this aspect, the restricting member held in the recess is biased toward the tubular member and engage with the through hole such that relative movement of the electric power source member is restricted. Also, the restriction can be released by pushing the restricting member toward the recess and disengaging the restricting member from the through hole, which enables the electric power source member to be removed from the tubular member. Since the restricting member is held in the recess, the restricting member does not separate from the electric power source member and the restricting can be prevented from becoming lost.

In accordance with a ninth aspect presented in this disclosure, the bicycle electric power source assembly according to any one of the first to eighth aspects is further configured such that the tubular member is a seat post and a saddle is provided on a first end portion of the seat post. With this aspect, the electric power source member can be stored in a seat post.

In accordance with a tenth aspect presented in this disclosure, the bicycle electric power source assembly according to any one of the second to fourth aspects is further configured such that the tubular member is a seat post, a saddle is provided on a first end portion of the seat post, and the positioning member is arranged closer to the first end portion than the restricting member. With this aspect, the position of the electric power source member is less likely to shift in a radial direction because the positioning member is provided in a position closer to the saddle than the restricting member.

In accordance with an eleventh aspect presented in this disclosure, the bicycle electric power source assembly according to the tenth aspect is further configured such that the through hole is provided closer to a second end portion of the seat post than to a middle position of the seat post between the first end portion and the second end portion, with the second end portion being opposite to the first end portion. With this aspect, the seat post can be prevented from having an excessive axial dimension.

In accordance with a twelfth aspect presented in this disclosure, an electric power source member is configured to be inserted into a tubular member that can be arranged on a bicycle and to be restricted from undergoing relative movement in an axial direction of the tubular member by a restricting member that has a restricting part and is arranged in the tubular member. The electric power source member has a restriction accepting part that engages with the restricting part. With this electric power source member, relative movement of the electric power source member in an axial direction of the tubular member can be restricted with a simple structure by the restricting part engaging with the restriction accepting part.

In accordance with a thirteenth aspect presented in this disclosure, the bicycle electric power source assembly according to the twelfth aspect is further configured such that the restriction accepting part includes one of a recess and a protrusion, while the restricting part includes the other of the recess and the protrusion such that the recess and the protrusion fit together for restricting relative movement of the electric power source member in the axial direction of the tubular member. With this aspect, the structure is even simpler because relative movement of the electric power source member in the axial direction is restricted by the fitting together of the recess and the protrusion.

In accordance with a fourteenth aspect presented in this disclosure, the bicycle electric power source assembly according to the thirteenth aspect is further configured such that the restriction accepting part includes the recess, while the restricting part includes the protrusion. With this aspect, the size of the electric power source member can be suppressed because the restricting part provided on the electric power source member is a recess.

In accordance with a fifteenth aspect presented in this disclosure, the bicycle electric power source assembly according to the fourteenth aspect is further configured such that the recess is an annular groove. With this aspect, it is not necessary to position the electric power source member with respect to the tubular member in a circumferential direction because the recess that engages with the protrusion of the restricting member is an annular groove.

In accordance with a sixteenth aspect presented in this disclosure, a tubular member for a bicycle is configured such that a restricting member can be arranged in the tubular member to restrict an electric power source member inserted into the tubular member from moving in an axial direction relative to the tubular member. The tubular member comprises an inner peripheral surface, an outer peripheral surface and a through hole that passes through the tubular member between the inner peripheral surface and the outer peripheral surface, and that receives the restricting member therein. With this tubular member, even if the electric power source member is arranged inside the tubular member, relative movement of the electric power source member in the axial direction can be restricted in a simple fashion because the restricting member is arranged in the through hole, which passes through the inner peripheral surface and the outer peripheral surface of the tubular member.

In accordance with a seventeenth aspect presented in this disclosure, the bicycle electric power source assembly according to the sixteenth aspect is further configured such that the tubular member is a seat post and a saddle is provided on a first end portion of the seat post. With this aspect, the electric power source member can be stored in a seat post.

With the disclosed bicycle electric power source assembly, relative movement of the electric power source member with respect to the tubular member in the axial direction of the tubular member can be restricted with a simple structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
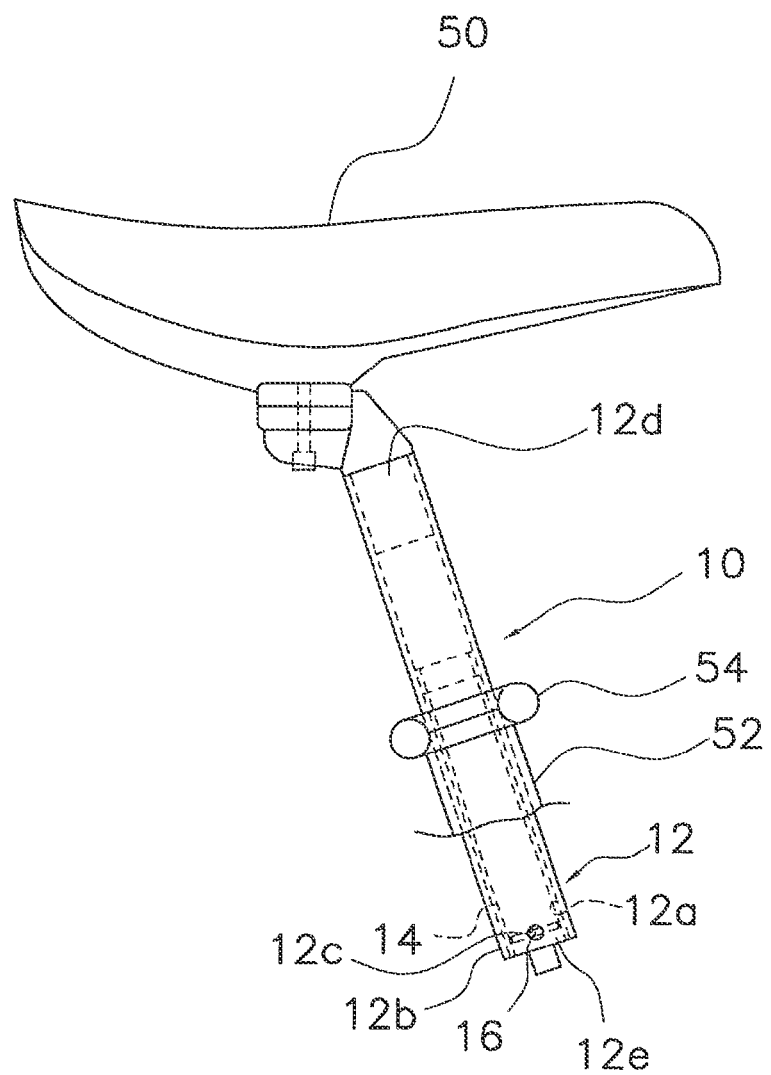
FIG. 1 is a side elevational view of a bicycle seat and a bicycle seat post in which the bicycle seat post is a part of a bicycle electric power source assembly in accordance with a first embodiment.
Figure 2:
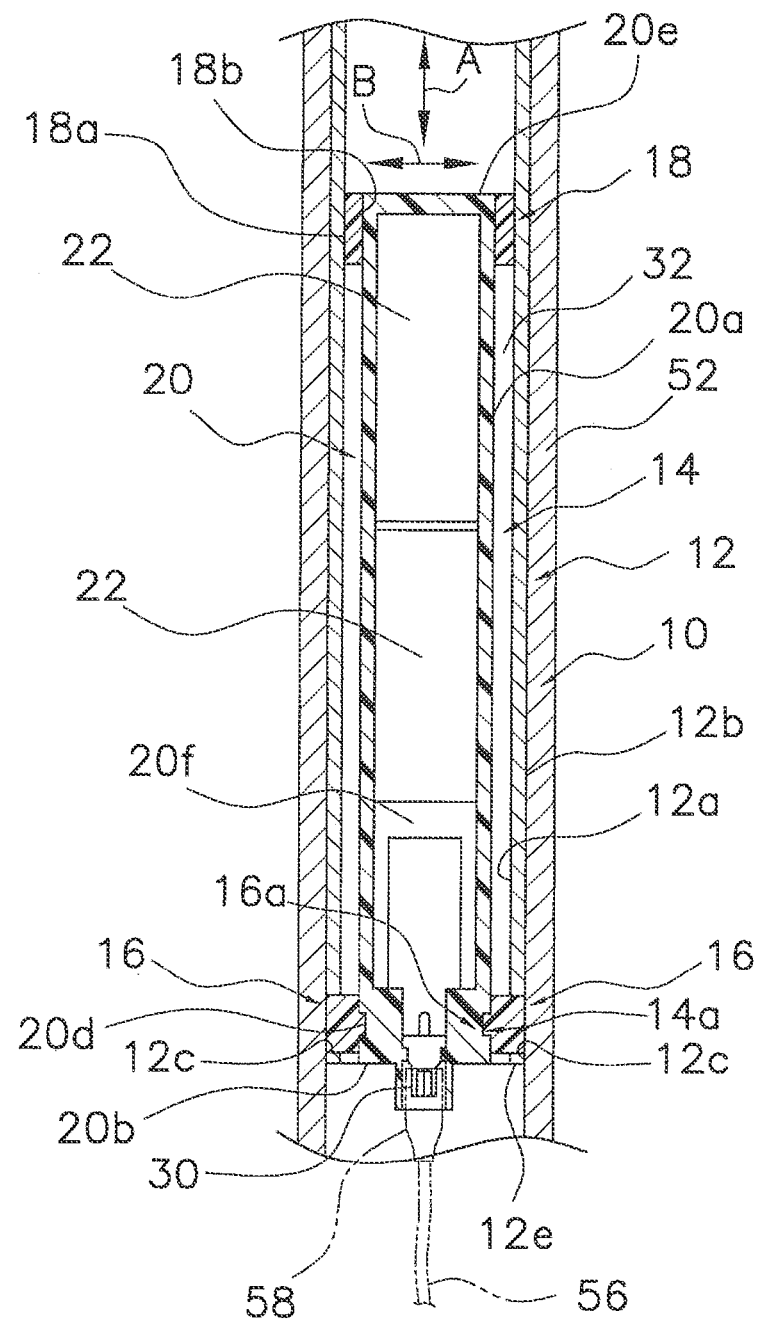
FIG. 2 is a partial longitudinal cross sectional view of the bicycle electric power source assembly illustrated in FIG. 1.

Referring initially to FIGS. 1 and 2, a bicycle electric power source assembly 10 is illustrated in accordance with a first embodiment. The bicycle electric power source assembly 10 basically includes a seat post 12, an electric power source member 14 and at least one restricting member 16. The seat post 12 is an example of a tabular bicycle part (a tubular member) of the bicycle electric power source assembly 10. A saddle 50 is mounted on the upper end of the seat post 12 in a conventional manner. The electric power source member 14 has a restriction accepting part 14a, and is inserted into the seat post 12. The restricting member 16 has a restricting part 16a that engages with the restriction accepting part 14a. The electric power source assembly 10 further includes a positioning member 18 that positions the electric power source member 14 in a radial direction of the seat post 12.

The seat post 12 is inserted into a seat tube 52 of the bicycle and fastened to the seat tube 52 with a fastening band 54. The amount by which the seat post 12 protrudes from the seat tube 52 can be adjusted freely. As a result, a height position of the saddle 50 can be adjusted. The seat post 12 has the shape of a circular cylinder. The seat post 12 has an inner peripheral surface 12a, an outer peripheral surface 12b, and at least one through hole 12c. The through hole 12c passes through the inner peripheral surface 12a and the outer peripheral surface 12b. The seat post 12 has a first end portion 12d where a saddle mounting portion is provided. Thus, the saddle 50 is mounted and a second end portion 12e at the opposite end of the seat post 12 as the first end portion 12d. The through hole 12c of the seat post 12 is provided closer to the second end portion 12e than a middle position or a midpoint between the first end portion 12d and the second end portion 12e. In the first embodiment, there are two of the through holes 12c provided near the second end portion 12e. The through holes 12c arranged 180 degrees apart from each other see FIG. 4).

Figure 3:
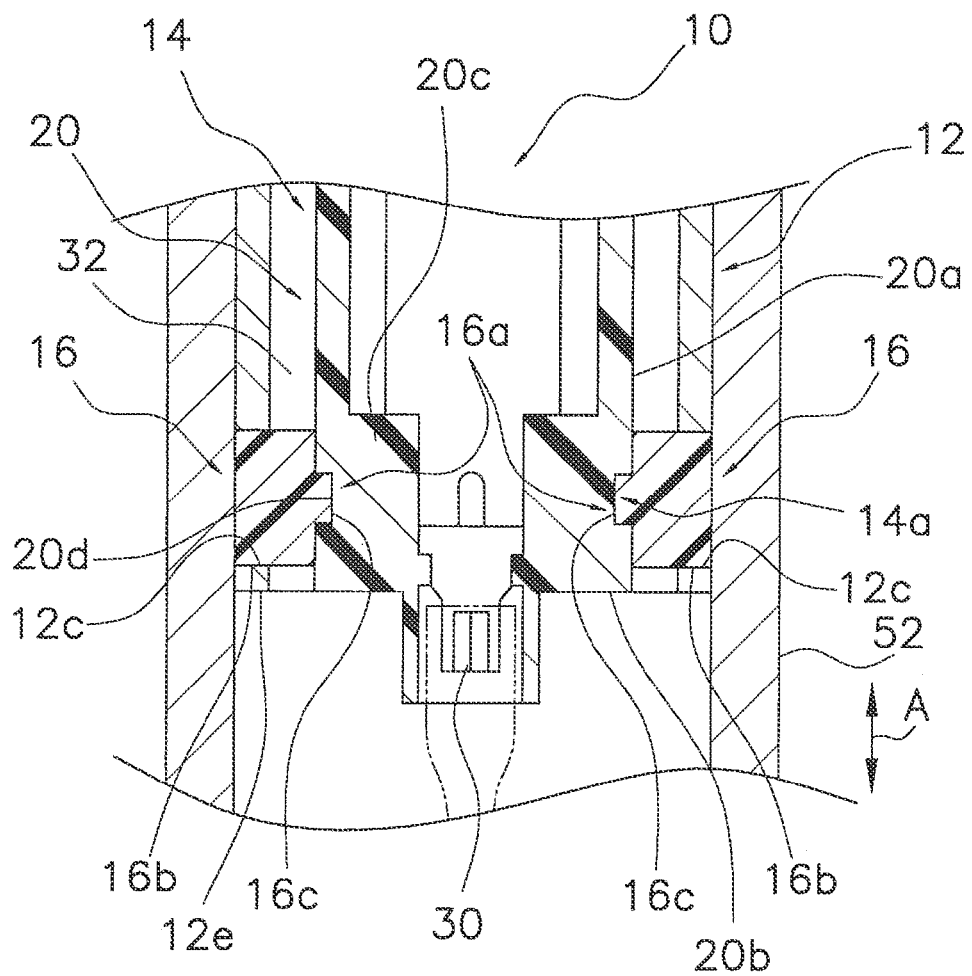
FIG. 3 is an enlarged cross sectional view of a second end portion of the bicycle electric power source assembly illustrated in FIG. 2.
Figure 4:
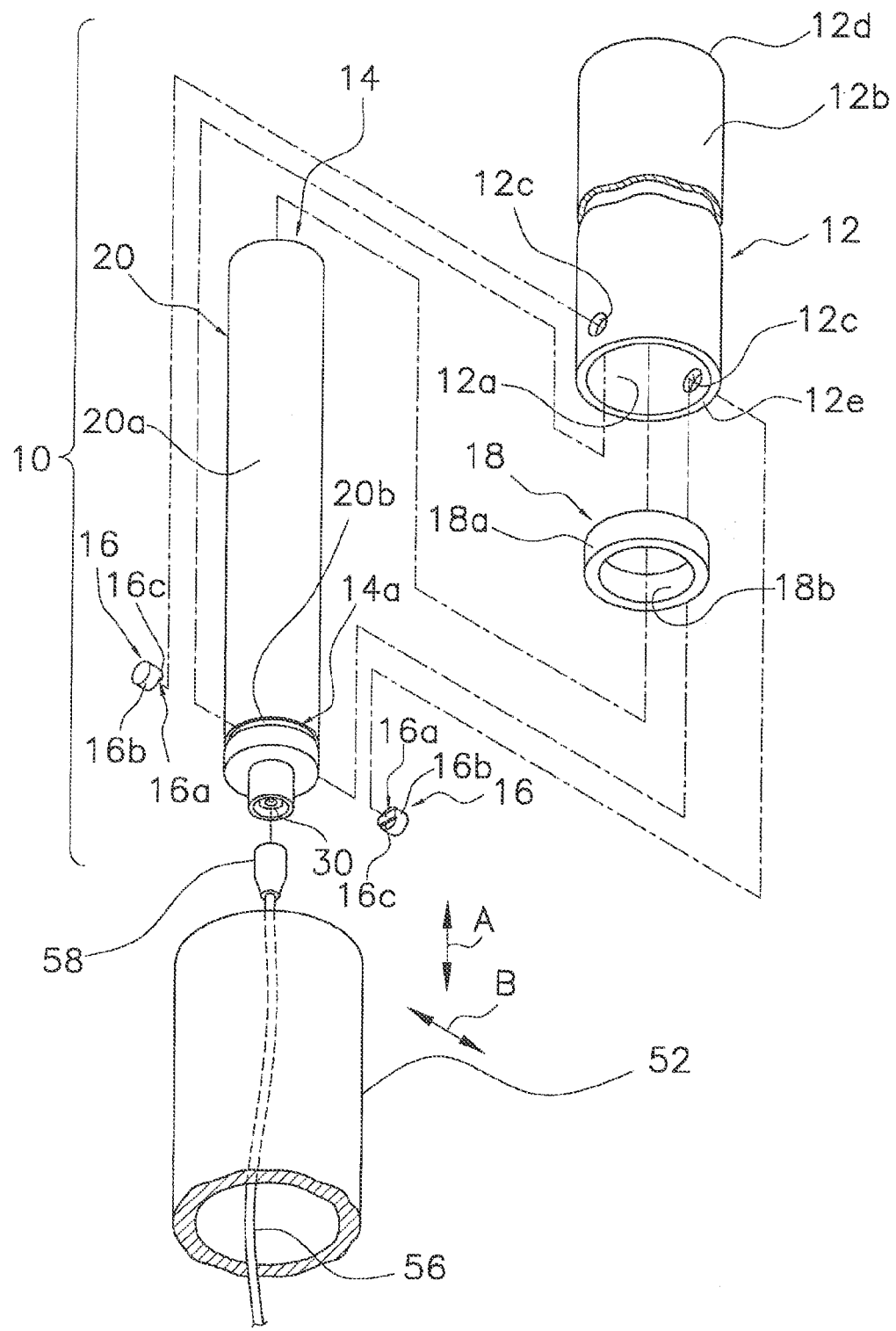
FIG. 4 is an exploded perspective view of the electric power source assembly illustrated in FIGS. 1 to 3.

As shown in FIGS. 2 to 4, the electric power source member 14 is a circular rod-like member inserted into the seat post 12. The electric power source member 14 has a case 20 on which the restriction accepting part 14a is provided. The electric power source member 14 also has at least one secondary battery 22 that is arranged inside the case 20. The secondary battery 22 serves as an electricity storage element. The case 20 is a generally tubular piece that is closed at both ends and made of for example, a synthetic resin. A terminal 30 is arranged on an end face of a first end 20b of the case 20 (left side in FIG. 2). The terminal 30 enables connection to a connector 58 provided on a tip end of an electric power source cable 56. The first end 20b of the case 20 has a thick-walled portion 20c that has a thicker wall thickness than other portions (see FIG. 3). The restriction accepting part 14a is formed on the outer peripheral surfaces 20a of the case 20 at the thick-walled portion 20c. The restriction accepting part 14a includes a recess 20d formed in the outer peripheral surface 20a of the case 20. The recess 20d is an annular groove. The diameter of the outer peripheral surface 20a of the case 20 is smaller than the diameter of the inner peripheral surface 12a of the seat post 12. As a result, a circular annular gap 32 is formed between the outer peripheral surface 20a of the case 20 and the inner peripheral surface 12a of the seat post 12.

There are, for example, two secondary batteries 22 arranged in series inside the case 20. Inside the case 20, a space 20f is formed between the secondary battery 22 and the terminal 30. Control circuitry, for example, is arranged in the space 20f.

As shown in FIGS. 3 and 4, the restricting member 16 is detachably provided in the through hole 12c and comprises, for example, a circular rod-like member made of a synthetic resin. In the first embodiment, two restricting members 16 are provided because two through holes 12c are provided. The restricting member 16 has a restricting part 16a that engages with the restriction accepting part 14a and a circular mounting section 16b that fits into the through hole 12c. The restricting part 16a is provided at the end of the mounting section 16b that is closer to the electric power source member 14. The restricting part 16a engages with the restriction accepting part 14a in order to restrict relative movement of the electric power source member 14 with respect to the seat post 12 in an axial direction of the seat post 12 (direction of arrows A). The restricting part 16a includes a protrusion 16c. The protrusion 16c is arranged along a diameter of the mounting section 16b and protrudes outward in an axial direction of the mounting section 16b. The protrusion 16c protrudes at such a width that it engages with the recess 20d.

As shown in FIGS. 2 and 4, the positioning member 18 is a circular annular member made of a synthetic resin. The positioning member 18 is arranged in the gap 32 and positions the electric power source member 14 with respect to the seat post 12 in a radial direction (direction of the arrows B) of the seat post 12. The positioning member 18 is arranged closer to the first end portion 12d than the restricting member 16. In the first embodiment, the positioning member 18 is arranged on an outer peripheral surface of the second end 20e of the case 20 as shown in FIG. 20. The positioning member 18 has an outer peripheral surface 18a that fits, for example, loosely into the inner peripheral surface 12a of the sheet post 12 and an inner peripheral surface 18b that fits, for example, snugly onto the outer peripheral surface 20a of the case 20 of the electric power source member 14. The positioning member 18 positions the electric power source member 14 in the direction of the arrows B by contacting the seat post 12 and the electric power source member 14.

With this electric power source assembly 10, when the electric power source member 14 is installed in the seat post 12, firstly the positioning member 18 is attached to the outer peripheral surface at the second end 20e of the case 20 of the electric power source member 14. Next, the electric power source member 14 is inserted through the second end portion 12e of the seat post 12 (lower end portion in FIG. 1) with the positioning member 18 attached and the terminal 30 facing downward. The electric power source member 14 is inserted into the seat post 12 until the end face of the second end portion 12e of the seat post 12 and the end face of the first end 20b of the case 20 of the electric power source member 14 are coplanar. As a result, the restriction accepting part 14a will be visible from the through holes 12c. From this state, the restricting members 16 are installed in the through holes 12c. When the restricting members 16 are installed in the through holes 12c, the circumferential positions of the restricting members 16 are adjusted such that the protrusions 16c of the restricting members 16 fit together with the recesses 20d of the electric power source member 14. Once the restricting members 16 have been installed in the through holes 12c such that the protrusions 16c fit into the recesses 20d, relative movement of the electric power source member 14 with respect to the seat post 12 will be restricted in the direction of the arrows A. Meanwhile, the positioning member 18 will position the electric power source member 14 with respect to the seat post 12 in the direction of the arrows B.

Figure 5:
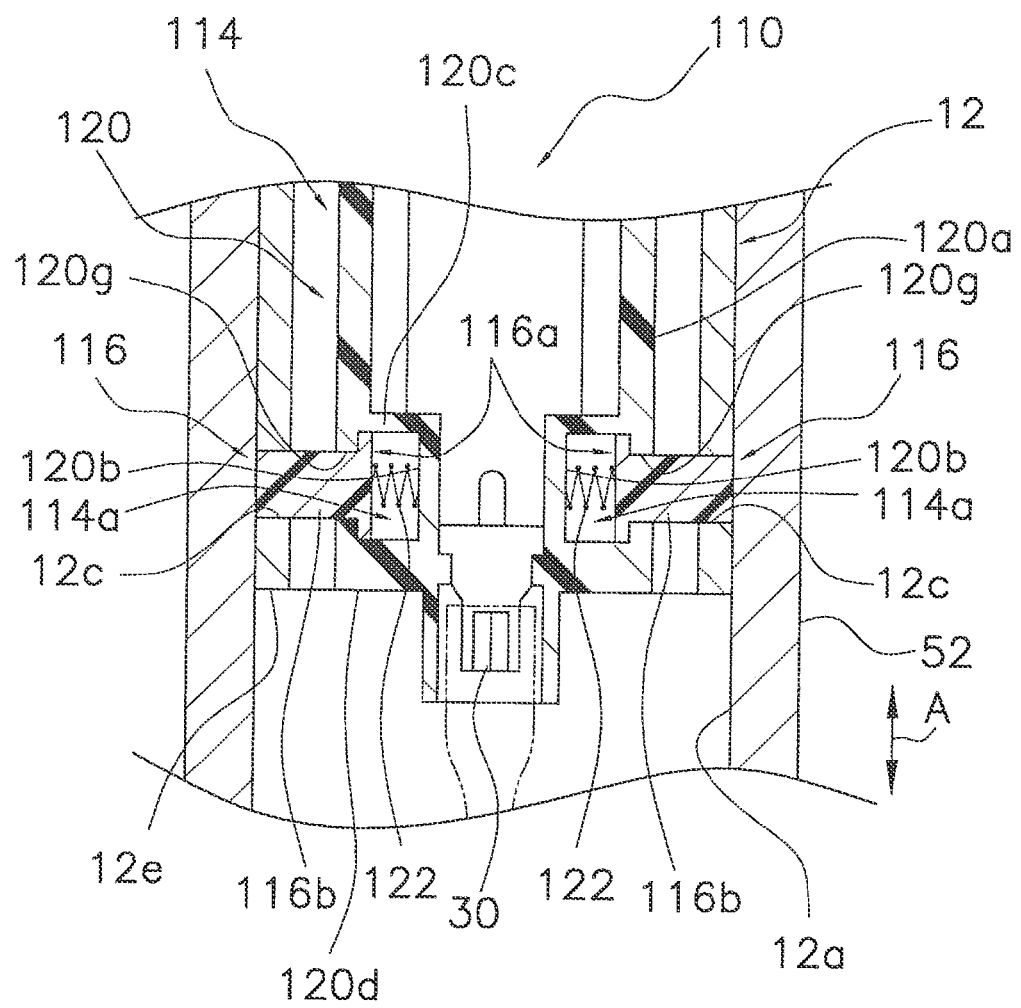
FIG. 5 is a cross sectional view, corresponding to FIG. 3, of an end portion of a bicycle electric power source assembly in accordance with a second embodiment.

Referring now to FIG. 5, a bicycle electric power source assembly 110 in accordance with a second embodiment will now be explained. Basically, the bicycle electric power source assembly 110 is identical to the bicycle electric power source assembly 10, except that features of the electric power source member 14 and the restricting member 16 of the bicycle electric power source assembly 10 have been modified in the bicycle electric power source assembly 110 as explained below. In view of the similarity between the first and second embodiments, the descriptions of the parts of the second embodiment that are identical to the parts of the first embodiment may be omitted for the sake of brevity. In other words, duplicate explanations of parts of the second embodiment that are the same as the first embodiment will be avoided.

The case 120 of the electric power source member 114 has a recess 120b for holding the restricting members 116 formed in an outer peripheral surface 120a. The electric power source member 14 and the electric power source member 114 are substantially the same except that the recess 20b and the recess 120b are differed. The recess 120b formed in the outer peripheral surface 120a of the case 120 has a small diameter section 120g where the diameter is smaller than other portions of the recess 120b. The small diameter portion 120g has an internal diameter substantially the same as the through hole 12c. In this embodiment, the restriction accepting part 114a includes the recess 120b.

The restricting member 116 is held in the recess 120b such that it can advance and retract with respect to the seat post 12. The restricting member 116 has a restricting part 116a that is held in the recess 120b and a mounting section 116b that can be installed in the through hole 120g and the through hole 12c. The electric power source assembly 110 further comprises a biasing member 122 that is arranged in the recess 120b to bias the restricting member 116 toward the seat post 12. The biasing member 122 is, for example, a coil spring arranged in the recess 120b in a compressed state. The biasing member 122 pushes the restricting part 116a of the restricting member 116 against the small diameter section 120b of the recess 120b such that the restricting member 116 can be held in the recess 120b with the mounting section 116b protruding from the case 120.

With this electric power source assembly 110, when the electric power source member 114 is installed into the seat post 12, the electric power source member 114 is inserted into the seat post 12 from the second end portion 12e (lower end portion in FIG. 5) of the seat post 12 until the mounting section 116b of the restricting member 116 contacts the end face of the second end portion 12e. Then, while pressing the mounting section 116b by hand, the electric power source member 114 is inserted into the seat post 12 until the mounting section 116 enters the interior of the seat post 12. At the same time, the circumferential position of the electric power source member 114 is adjusted such that the restricting member 116 faces toward the through hole 12c. The electric power source member 114 is inserted into the seat post 12 until the mounting section 116b of the restricting member 116 faces the through hole 12c and the restricting member 116 fits into the through hole 112c due to being pushed by the biasing member 122. Once the mounting sections 116b of the restricting members 16 have been installed in the through holes 12c, relative movement of the electric power source member 114 with respect to the seat post 12 will be restricted in the direction of the arrows A. Although the parts of the electric power source member 114 and the restricting members 116 according to the second embodiment that are not explained are the same as the parts of the first embodiment, those parts are indicated in FIG. 5 with 100 added to the original reference numerals of the first embodiment.

With these electric power source assemblies 10 and 110, relative movement of the electric power source 14 with respect to the seat post 12 in the direction of the arrows A can be restricted with a simple structure due to the restricting parts 16a or 116a of the restricting members 16 or 116 arranged in the through holes 12c engaging with the restriction accepting parts 14a or 114a of the electric power source members 14 or 114.

Also, the electric power source member 14 can be positioned with respect to the seat post 12 in the direction of the arrows B because the positioning member 18 is arranged in the gap 32 between the electric power source member 14 and the seat post 12.

The bicycle electric power source assembly is not limited to the previously explained embodiments and various modifications can be made without departing from the scope of the invention as defined by the claims. In particular, the embodiments and variations presented in this specification can be combined in any desired way.

Although the first and second embodiments present a seat post as an example of a tubular member, the present invention is not limited to a seat post. For example, it is acceptable if the tubular member is a steering column, a handlebar or a handle stem. Moreover, while the tubular member is illustrated as a cylindrical member, the inner and outer peripheral surfaces or shapes of "tubular member" are not limited by the illustrated embodiments. Rather, the inner and outer peripheral surfaces or shapes of "tubular member" can be optionally selected from any suitable shapes, e.g. a non-circular cross sectional shape such as a polygon.

Although in the previously explained embodiment a secondary battery is presented as an example of an electric power storage element of the electric power source member, the present invention is not limited to a secondary battery. For example, it is acceptable to use a primary battery, an electric double-layer capacitor, or another large-capacity capacitor as the electricity storage element.

Figure 6:
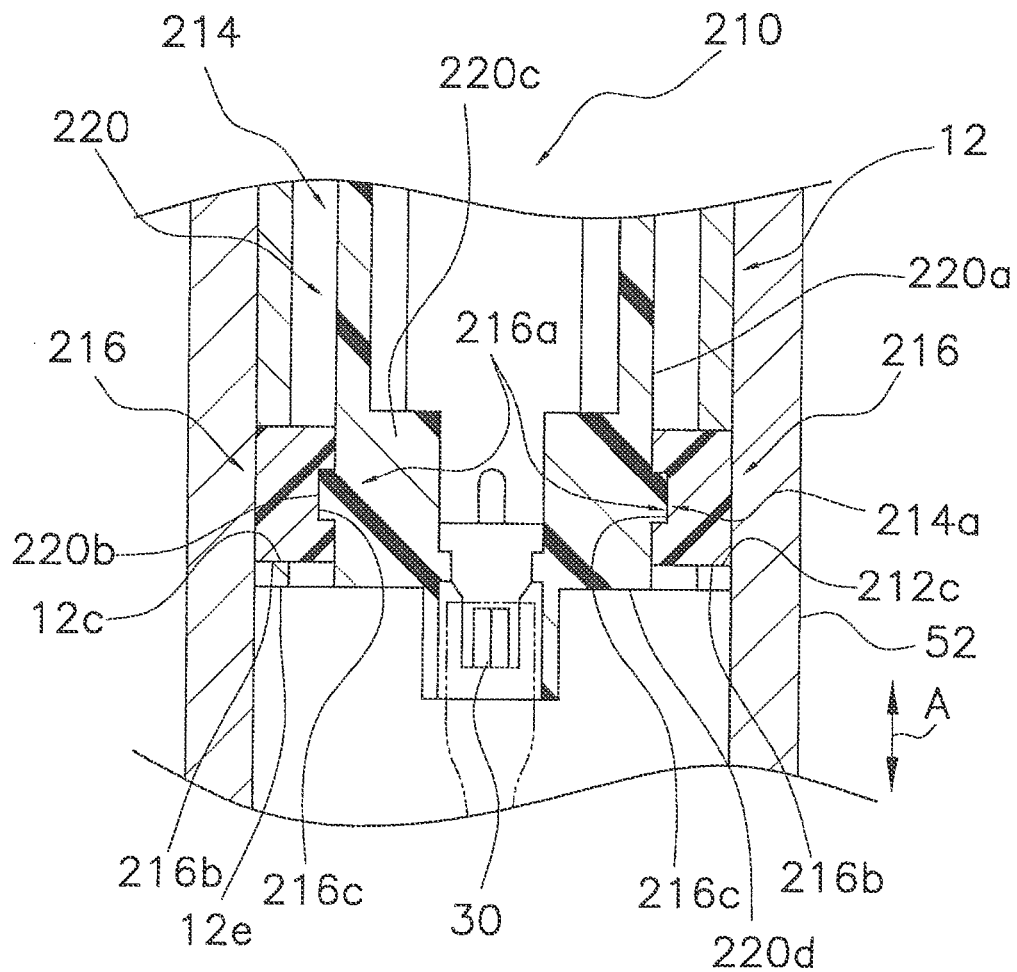
FIG. 6 is a cross sectional view, corresponding to FIG. 3, of an end portion of a seat post and a bicycle electric power source assembly in accordance with a third embodiment.

In the electric power source assembly 10, a recess 20d is provided on the restricting member 14 as the restriction receiving section 14a and a protrusion 16c is provided on the restricting member 16 as the restricting part 16a. However, it is acceptable to reverse this arrangement. For example, FIG. 6 shows an electric power source assembly 210 in which the case 220 of the electric power source member 214 has a restriction accepting part 214a that includes an annular protrusion 220b formed on an outer peripheral surface 220a. Meanwhile, the restricting member 216 has at least one recess 216c. With such a configuration, the same operational effects are exhibited as with the first embodiment. Although the parts of the electric power source member 214 and the restricting members 216 that are not explained are the same as the parts of the first embodiment, those parts are indicated in FIG. 6 with 200 added to the original reference numerals of the first embodiment.

Although the recess 20d is an annular groove in the previously explained embodiments, it is acceptable to provide independent recesses.

It is acceptable for at least the positioning member 18 to be made of rubber or another elastic material, and it is acceptable for both the positioning member 18 and the restricting member 16 to be made of rubber or another elastic material. With a positioning member made of an elastic material, it is possible to accommodate tubular members having different inner peripheral surfaces.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle electric power source assembly comprising:
   a tubular member including an inner peripheral surface, an outer peripheral surface and a through hole that passes through the tubular member between the inner peripheral surface and the outer peripheral surface;
   an electric power source member disposed inside the tubular member, the electric power source member including a restriction accepting part; and
   a restricting member disposed in the through hole, the restricting member including a restricting part that engages with the restriction accepting part to restrict relative movement of the electric power source member with respect to the tubular member in an axial direction of the tubular member.

2. The bicycle electric power source assembly as recited in claim 1, further comprises
   a positioning member arranged in a gap formed between the electric power source member and the inner peripheral surface of the tubular member, and positioning the electric power source member with respect to a radial direction of the tubular member while the electric power source member is disposed within the tubular member.

3. The bicycle electric power source assembly as recited in claim 2, wherein
   the gap is an annular gap, and
   the positioning member is an annular member.

4. The bicycle electric power source assembly as recited in claim 3, wherein
   the annular gap is circular; and
   the positioning member is circular.

5. The bicycle electric power source assembly as recited claim 1, wherein
   the restriction accepting part of the electric power source member includes one of a recess and a protrusion that is provided on an outer peripheral surface of the electric power source member;
   the restricting part of the restricting member includes the other of the recess and the protrusion; and
   the recess and the protrusion fit together and restrict relative movement of the electric power source member in the axial direction of the tubular member.

6. The bicycle electric power source assembly as recited in claim 5, wherein
   the restriction accepting part of the electric power source member includes the recess; and
   the restricting part of the restricting member includes the protrusion.

7. The bicycle electric power source assembly as recited in claim 6, wherein
   the recess of the electric power source member is an annular groove.

8. The bicycle electric power source assembly as recited in claim 1, wherein
   the restriction accepting part of the electric power source member includes a recess having a biasing member disposed in the recess, the restricting member is movably disposed in the recess to advance and retract with respect to the tubular member, and the biasing member biases the restricting member toward the tubular member.

9. The bicycle electric power source assembly as recited in claim 1, wherein
the tubular member is a seat post and a saddle is provided on a first end portion of the seat post.

10. The bicycle electric power source assembly as recited in claim 2, wherein
the tubular member is a seat post and a saddle is provided on a first end portion of the seat post; and
the positioning member is arranged closer to the first end portion of the seat post than the restricting member.

11. The bicycle electric power source assembly as recited in claim 10, wherein
the through hole is provided closer to a second end portion of the seat post than to a middle position of the seat post between the first and second end portions, the second end portion being opposite to the first end portion.

12. An electric power source member configured to be inserted into a tubular member that can be arranged on a bicycle, the electric power source member being further configured to be restricted from undergoing relative movement in an axial direction of the tubular member by a restricting member that has a restricting part and is arranged in the tubular member, the electric power source member comprising:

a restriction accepting part that includes a recess disposed on an outer peripheral surface of the electric power source member to engage with the restricting part.

13. The electric power source member as recited in claim 12, wherein
the restricting part includes a protrusion such that the recess and the protrusion fit together for restricting relative movement of the electric power source member in the axial direction of the tubular member.

14. An electric power source member configured to be inserted into a tubular member that can be arranged on a bicycle, the electric power source being further configured to be restricted from undergoing relative movement in an axial direction of the tubular member by a restricting member arranged in the tabular member and having a restricting part, the electric power source member comprising:

a restriction accepting part that engages with the restricting part, the restriction accepting part includes a recess that is an annular groove, while the restricting part includes a protrusion such that the annular groove and the protrusion fit together for restricting relative movement of the electric power source member in the axial direction of the tubular member.

* * * * *